Jan. 16, 1945.  W. W. LOWTHER  2,367,227
AIR CLEANER
Filed May 2, 1942
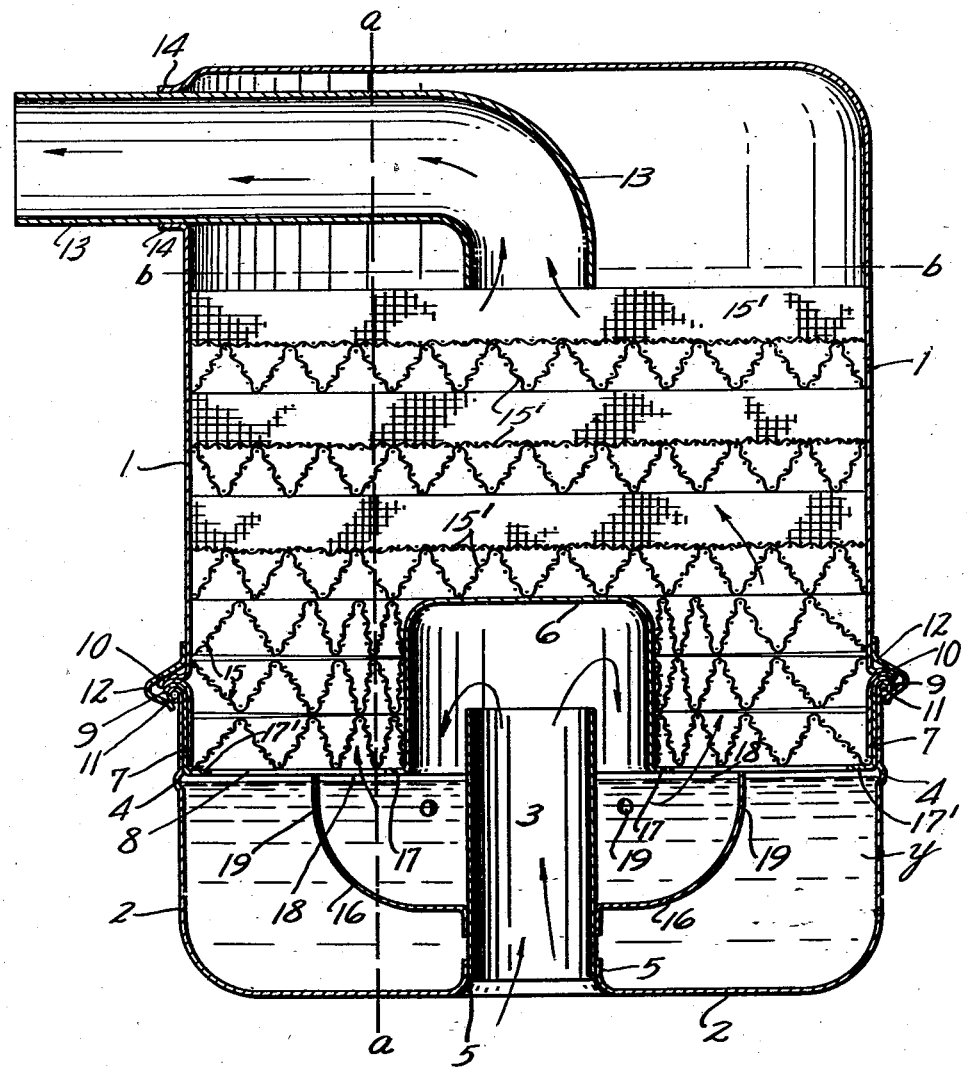
Inventor
Wilfred W. Lowther
By his Attorneys Patented Jan. 16, 1945

2,367,227

UNITED STATES PATENT OFFICE 2,367,227

AIR CLEANER

Wilfred W. Lowther, Minneapolis, Minn.

Application May 2, 1942, Serial No. 441,483

1 Claim. (Cl. 183—15)

Generally stated, my present invention relates to improvements in air cleaners of the type which contain a body of free moving liquid, usually oil, and which are often referred to in the art as the liquid washed type of air cleaner. More particularly, however, my present invention relates to improvements in air cleaners of the general type defined and which improvements are directed particularly toward adapting this type of cleaner to types of service where they are apt to be operated at various angles with respect to their normal right side up vertical positions.

Air cleaners of the type containing a free moving body of liquid have long been considered the most efficient and desirable type for use in connection with internal combustion engines for removing dust from the air intakes thereof, but cleaners of this type have largely been avoided for use in connection with motorcycles and airplanes which frequently operate at severe angles with respect to their normal right side up vertical positions because of the generally recognized tendency of such cleaners to spill and lose oil under such conditions, and while some attempts have hitherto been made to provide air cleaners of this type, which would retain their oil under such conditions, such prior attempts have usually resulted in increased cost, reduced efficiency and reduced air handling ability for a cleaner of given dimensions. Furthermore, such prior attempts to solve this problem have not been entirely satisfactory with respect to their ability to retain their oil under all conditions of operation in connection with airplanes and motorcycles; it being understood that airplanes occasionally fly upside down as well as at severe angles to their normal right side up positions and that motorcycles not only operate at severe angles frequently but occasionally fall over on to their sides.

The air cleaner of my present invention is adapted to contain a sufficiently large volume of liquid to permit operation under severe dust conditions for relatively long periods between servicing intervals; is highly efficient in its air cleaning action; is capable of handling a large volume of air as compared to other cleaners of similar physical dimensions; will operate satisfactorily throughout a wide range of angles with respect to its normal right side up vertical position; and can be operated at all rotated positions with respect to its normal right side up position, including an upside down position, without serious loss of oil through its inlet, outlet or otherwise.

The above and other highly important objects and advantages of the invention will be made apparent from the following specification, claim and appended drawing.

Referring to the drawing, the single view of the drawing is a vertical, axial, sectional view of an air cleaner embodying the present invention.

The cleaner's casing or shell is in the nature of a vertically disposed cylindrical section 1 that is closed at its upper end but which is primarily open at its lower end. The lower end of the casing section 1 is primarily open but is normally closed by a cylindrical oil sump-forming section 2 that is telescoped on to the lower end of the section 1.

Opening axially through the bottom of the sump-forming section 2 is a vertically disposed intake tube 3 that rises to a level somewhat above the normal static liquid level in the well; the normal liquid level being indicated by an annular bead 4, and the liquid being indicated by y. The lower end of the intake tube 3 is anchored to an annular flange 5 on the bottom of the sump-forming element 2 to provide a liquid tight joint.

Disposed concentrically over the upper discharge end of the inlet tube 3 is an air stream direction reversing baffle 6 preferably in the nature of an inverted cup of larger diameter than the intake tube 3. This inverted cup-like baffle 6 has its top and its cylindrical sides spaced from the inlet tube 3 and receives the upper end portion of said intake tube 3 to provide with said tube a downwardly directed annular continuation of the air intake passage through said tube 3. The cup-like baffle 6 is integrally formed with an annular coupling flange 7 with which it is connected by means of a spider consisting of circumferentially spaced series of narrow spokes 8, which latter are not shown in detail but of which there may be assumed to be four or six. The spokes 8 of the spider, being very few in number and very narrow, will, of course, provide no substantial reduction in open area between the lower edge of the inverted cup 6 and the side of the casing.

The coupling flange 7 is loosely telescoped over the lower end of the shell section 1 and is provided with an outturned cross-sectionally channel shaped flange 9 at its upper end that nests under a similarly shaped flange 10 on the section 1. The sump-forming section 2 of the casing is, in turn, loosely telescopically applied over the flange 7 and is provided with a beaded upper edge 11 that is nested under the channel shaped flange 9. The flanges 9, 10 and 11 are normally detachably held together by a split channel-shaped clamping ring or band 12.

Leading from the upper portion of the cleaner casing is a clean air outlet tube or conduit 13, the receiving end of which tube or conduit 13 is downwardly directed and co-axially aligned with the air intake tube 3, baffle 6 and the cylindrical walls of the casing. While in some instances it may be desirable to have this clean air outlet tube 13 extend vertically axially through the top of the casing, the present disclosure shows this tube as being in the nature of an elbow extending outwardly through the upper side portion of the casing whereto it is rigidly anchored, by welding or the like, to a casing flange 14. The receiving end of the clean air outlet tube 13 is well spaced from the top of baffle 6 and the entire space within the cleaner casing between the open lower end of baffle 6 and the receiving end of the outlet tube 13 constitutes an air expansion chamber and is preferably filled with an air pervious liquid collecting element which, as shown, comprises a plurality of stacked corrugated woven wire screens 15 and 15'. Those screens 15 which surround the baffle 6 may be assumed to be like those of the Schulz Patent No. 2,011,303 of August 13, 1935, whereas the screens 15 above the baffle 6 are formed to provide straight parallel corrugations and stacked so that the corrugations of adjacent screens extend transversely one to the other to prevent nesting.

The screens 15 and 15' are stacked one upon the other and the whole supported upon radial annular flanges 17 and 17' and the spokes 8 of the spider and are held against upward displacement by virtue of engagement with the receiving end of the air outlet tube 13 with the top screen 15' in spaced relation to the closed top of the casing 1. An emergency sump of a size to hold the entire oil supply, from the normal sump 2 is thus provided surrounding the receiving end of the outlet tube 13.

In the arrangement described the liquid sump is readily removable for servicing when the clamping band 12 is loosened or removed, and when the sump is thus removed the baffle 6 and integrally formed spider and flange 7 may be readily removed which will permit the screen elements to be likewise displaced for such servicing as may be necessary.

It may be stated, however, that the intercepting and oil collecting element made up of the screens 15—15' is not a filter in the sense that tightly packed metal shavings, moss, fiber or horse hair constitute a filter and is not usually subject to clogging with dust; its function being to intercept and return liquid to the sump rather than to filter out dust.

It is important to note that the cleaner is so designed that the fluid level will be safely spaced from the open inner ends of the intake tube 3 and outlet tube 13 under all rotated positions of the cleaner. For example, when the cleaner is turned on its side by rotating the same 90° in a counterclockwise direction with respect to the drawing, the fluid level would be indicated by a broken line a—a, and if the cleaner be turned 180° to an upside down position, the fluid level will then be indicated by broken line b—b. By reference to the drawing it will be noted that lines a—a and b—b are safely spaced from the open inner ends of the tubes 3 and 13 so that no oil will escape through either thereof under these conditions.

Preferably the structure further includes a cup-like baffle element 16 that is applied concentrically over and anchored to the intake tube 3 by welding or the like. This baffle 16 is anchored to the tube 13 well below the bottom of the baffle 6 and is directed radially outwardly and upwardly from said tube 3. The open upper end of the baffle 16 is of materially greater diameter than the outturned flange 17 of the baffle 6 so as to provide between said flange 17 of the baffle 6 and the baffle 16 an upwardly directed annular air passage 18 of considerably greater cross-sectional area than the cross-sectional area of the annular passage between the cylindrical wall of baffle 6 and the intake tube 3. It is important to note, however, that the maximum diameter of baffle 16 is considerably less than that of the interior of the casing. The baffle 16 is, preferably and as shown, located substantially wholly within the oil sump and is preferably provided with small liquid flow passages 19 for communication between the interior of baffle 16 and that portion of the liquid sump outwardly of baffle 16.

Operation

Assuming now that the projected end of clean air outlet tube 13 of the cleaner is connected to the intake of an internal combustion engine in the usual manner and that said engine is operating, the cleaner will function substantially as follows.

Partial vacuum will be produced in the engine's intake as a result of the engine piston intake strokes, and air will rush into the engine's intake through the cleaner under atmospheric pressure. Atmospheric air will enter and pass through the axial air inlet tube 3 at high velocity and will discharge into the inverted cup-like baffle 6 within which the direction of the air will be reversed and passed downwardly into the inner cup-like baffle 16. Upon entering the cup-like baffle 16, the annular stream of air will again reverse its direction of travel and will pass upwardly through the annular air passage 18 into the screen-equipped expansion chamber from which the air will, of course, pass outwardly through the clean air outlet tube 13 into the engine. Oil or other fluid that normally largely fills the baffle 16 under static conditions will be largely displaced therefrom and carried upwardly into the screen-equipped expansion chamber with the incoming air initially introduced. That is, most of this oil will be picked up by the air and delivered into the screen-equipped expansion chamber. This oil thusly carried up into the expansion chamber will form films over the openings in the several lower screen elements 15 only to be broken and formed over other screen openings while draining downwardly back to the liquid sump, the screens serving largely as a liquid intercepting and returning medium. Of course, the air stream passing above the upper edge of baffle 16 and into the expansion chamber will expand rapidly at this point and the velocity of the air will be greatly reduced within the expansion chamber.

A large portion of the oil displaced from the cup-like baffle 16 will accumulate and build up a head of oil radially outwardly of the upper edge of baffle 16 and this head of oil will constantly tend to overflow the upper edge of baffle 16 and will be picked up by the expanding air stream only to become mixed with the air and then ultimately returned by the screens to this head radially outwardly and above the upper edge of the cup-like baffle 16. By the time the air has reached the receiving end of the clean air outlet tube 13, the dust and oil removing processes will have been completed, and only clean, dry air will pass out through the tube 13 to the engine.

Due partly to the fact that the air stream expands within the cup-like baffle 16, and due in part to the fact that there is maintained a head of oil above the oil passages 19, there will be an inward flow of oil through these passages 19 under operating conditions which will further tend to keep the expanded air stream supplied with oil.

A large part of the dust, and in fact all of the heavier particles of dust, will be removed from the air through the process of impingement within the lower part of the cup-like baffle 16, and the balance of the dust, consisting mostly of the lighter ends, will become dust coated during its passage through the cup-like baffle 16 or within the lower portions of the expansion chamber, and such dust will be trapped in the oil and delivered to the bottom of the oil sump where it will be collected.

Not only does the cleaner described operate very efficiently at a wide variety of angles with respect to its normal vertical position, but it will permit uninterrupted engine operation and will retain its oil in all rotated positions including an upside down position such as is encountered frequently in airplane use. Furthermore, the construction illustrated is simple and inexpensive, is easily serviced, and has a relatively very great air handling ability with respect to its overall physical dimensions.

What I claim is:

In an air cleaner of the liquid washed type, a vertically disposed casing closed at its upper and lower ends and providing a normal liquid sump in its bottom, a vertically disposed air intake tube concentrically disposed with respect to the sides of the casing and opening through the bottom thereof, said air intake tube upwardly terminating with its upper end above the maximum normal static liquid level in said sump, and inverted cup of greater diameter than said air intake tube disposed directly over the open upper end of said intake tube with its closed top and its sides spaced from the upper end portion of the said intake tube, whereby to provide with said air intake tube a downwardly directed annular continuation of the upwardly directed air passage formed by said intake tube, an air outlet conduit opening through the upper portion of the casing and terminating with its air inlet end disposed coaxially of the casing and downwardly directed and in axially spaced relation to the closed upper end of said inverted cup, an air pervious liquid collecting medium filling the space within the casing between the lower edge of the inverted cup and the intake end of the outlet conduit, the closed upper end of the casing providing an emergency sump above the medium surrounding the outlet conduit so as to receive the entire oil supply from said normal sump when the casing is inverted, and an annular cup-like baffle concentrically disposed around the air intake tube within the normal liquid sump, the upper edge of said cup-like baffle terminating in close proximity to the plane of the lower edge of the inverted cup and being of greater diameter than said lower edge of the inverted cup but of materially less diameter than the interior of the casing, whereby to provide an annular upwardly directed continuation of the downwardly directed passage portion formed by the intake tube and the inverted cup and an annular liquid return passage to the sump surrounding said cup-like baffle.

WILFRED W. LOWTHER.